United States Patent [19]
Vijaymohan et al.

[11] Patent Number: 5,461,013
[45] Date of Patent: Oct. 24, 1995

[54] PROCESS FOR THE PREPARATION OF LITHIUM STANATES DOPED WITH TRANSITION METAL CATIONS

[75] Inventors: Kunjukrishna P. Vijaymohan; Imtiaz S. Mulla; Parthasarathy Ganguly, all of Maharashtra, India

[73] Assignee: Council of Scientific & Industrial Research, New Delhi, India

[21] Appl. No.: 220,364

[22] Filed: Mar. 30, 1994

[51] Int. Cl.$^6$ .................................................. C04B 35/00
[52] U.S. Cl. ........................ 501/134; 423/21.1; 423/62; 423/65; 423/89; 423/92
[58] Field of Search ........................ 501/134; 423/21.1, 423/62, 65, 89, 92

[56] References Cited

U.S. PATENT DOCUMENTS 3,960,779  6/1976  Rosenblatt ................................ 501/135
4,319,485  3/1982  Terada et al. ............................ 501/134

*Primary Examiner*—David Brunsman
*Attorney, Agent, or Firm*—Ladas & Parry

[57] ABSTRACT

A process for the preparation of ceramic material Lithium stannate doped with a transition metal for a humidity sensor mixes a salt of Lithium with $SnO_2$ in dry condition, thereafter mixes in wet conditions using an organic solvent, adds a transition metal compound to the resulting mixture, mixes the mixture thoroughly, drys and compacts the mixture in the range of 5000 to 8000 lbs and heats the pellets so formed at a temperature in the range of 600° to 800° C. for a period in the range of 6 to 12 hours followed by slow cooling to room temperature.

6 Claims, 1 Drawing Sheet

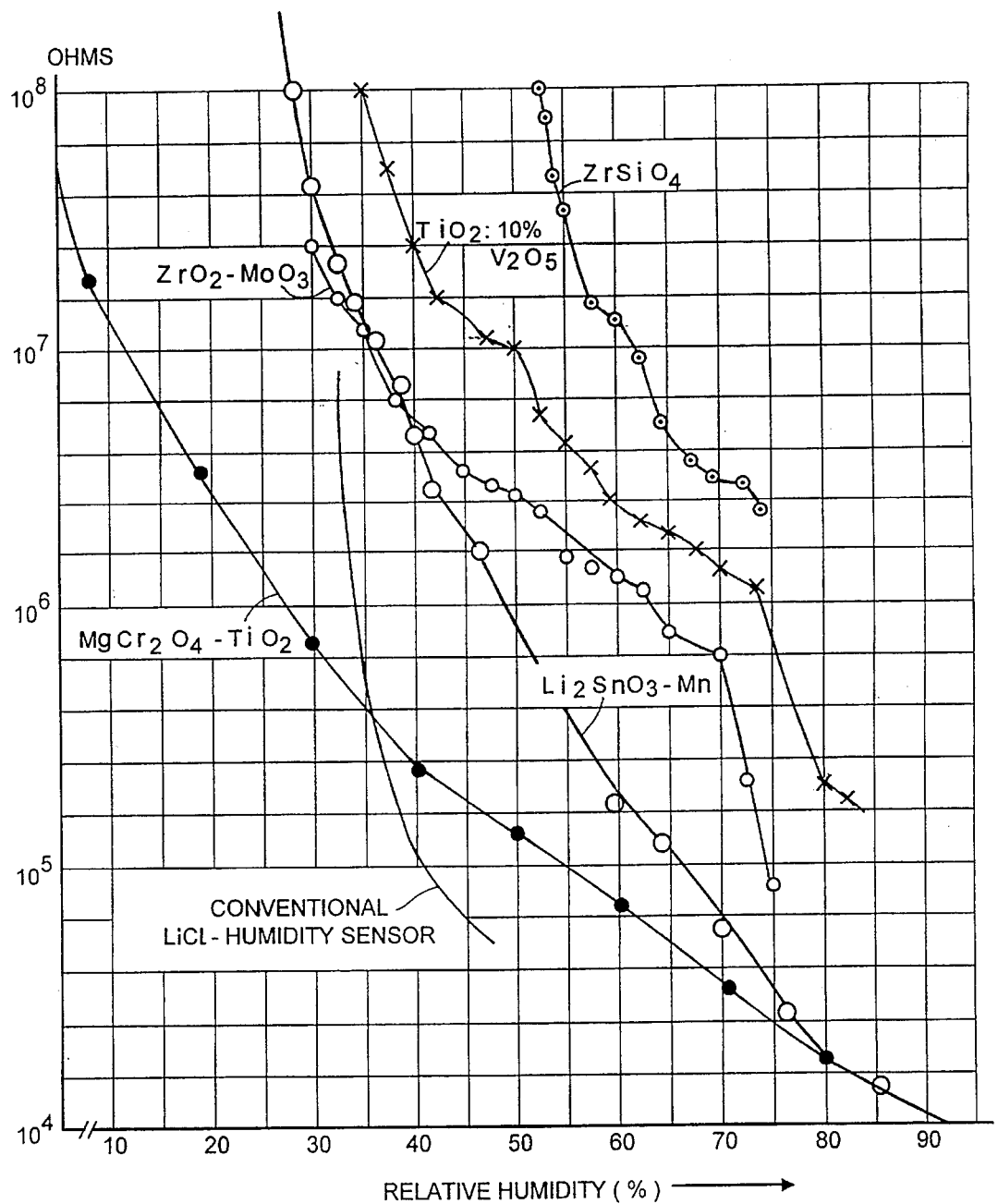

PROCESS FOR THE PREPARATION OF LITHIUM STANATES DOPED WITH TRANSITION METAL CATIONS

The present invention relates to a process for the preparation of Lithium Stannates doped with transition metal cations. The Lithium Stannates prepared by the present invention is useful especially for making ceramic humidity sensors.

Rapid, reliable and accurate estimation of humidity is an important prerequisite in designing control systems for industrial processes and human comfort. Measurement and control of humidity of the environment is also useful for several other applications including domestic electric appliances, automobiles, weather control, agriculture, and medical services. Among the different types of techniques used for humidity sensing, those employing electrical measurements are more significant due to easy signal processing capabilities and flexibility for miniaturization. Of particular interest, is he one using ceramic oxides as their robustness and ability to control porosity by processing makes them far superior compared to polymers and other materials. Moreover, most of these ceramics are made from abundant resources and hence they can be processed to achieve cost effectiveness. Finally the physical strength and chemical inertness of these functional ceramics are of added values as these humidity sensors are normally exposed to atmospheres containing various other components.

At present, several materials are being used in making the sensitive parts of humidity sensors. They include electrolytes (e.g. Lithium chloride), organic polymers and porus ceramics (Kulwicky, M., *J. Am. Ceram. Soc.*, 74 (1991) 697). Depending on the operation temperature and humidity ranges one of these materials is used in making humidity sensors with various accuracies and sophistication.

The lithium chloride based hygrometer operates on the principle that LiCl solution immersed in a porous binder changes its ionic conductivity depending on the relative humidity of the surroundings. In some of the modified versions glass fibers and polymers are mixed with the electrolyte for convenience of handling and flexibility.

Humidity sensors using polymeric films are becoming increasingly important due to their ease of fabrication and cost effectiveness. In a typical case, the change in electrical resistance or capacitance of a polymeric (co-polymeric) film made with substituted methacrylic esters or styrenosulphonates or acrylamides are measured with change in relative humidity (S. Miyoshi, T. Sarihara and M. Higikagawa, U.S. Pat. No. 4,528,543, Jul. 9, 1985; S. Kinomoto, et al., U.S. Pat. No. 4,386,336, May 31, 1983). Various polymers and copolymers have been tested and some of them have been successfully applied on silicon chips using microelectronic processing techniques.

In the case of ceramic humidity sensors, mixtures of semiconducting oxides are generally used to fabricate the sensing elements, and the measurement is much akin to that of the polymeric type (Takenaka Hiroshi, Jap. Pat. No. 02/176,550, Jul. 9, 1990; Takeishi, et al., Jap. Pat. No. 59/186,304, Oct. 23, 1984). They are based on the absorption of water molecules in the pores and the grain boundaries of these materials. Commercial devices based on porus, anodic $Al_2O_3$ have been available for a number of years. More important is the type based on resistance measurements of ceramic oxides systems, namely $MgO$—$Cr_2O_3$, $SiO_2$—$ZnO$, $ZnCr_2O_4$—$LiZnVO_4$, and potassium doped stabilized zirconia, as these allow the fabrication of low cost humidity sensors for robust applications. Several such compositions have been found recently and some of these systems have been commercially exploited.

Regarding the electrolytic type, there are too many disadvantages like the humidity range covered by one unit is narrow, poor mechanical strength, slow response and subtle operation. Their use in very humid environments should be avoided so as not to lower the accuracy and life time. The polymeric types show degradation from smoke, oil and vapors and long term drifts demand frequent calibration. Rejuvenation of the sensing element is also difficult and those based on capacitance measurements require frequent recalibration and complex circuitry. A more important problem encountered in using polymeric humidity sensors is that of water resistivity. Polymer electrolytes are generally hydrophilic and soluble in water and hence have a poor durability against water or due condensation. The response time is also very slow, typical values being a few minutes. In order to get quicker response, the film should be as thin as possible and this is at the expense of mechanical stability and integrity. Another serious drawback of polymeric humidity sensors is the shape change and swelling accompanied by water absorption, and this is particularly significant for specialized applications humidity range. These materials also undergo stress-induced cracking on long term use.

The prior art suffers from major drawbacks mentioned hereafter. As regards porous ceramic oxides, it was thought that they are most suitable materials for humidity sensors due to their mechanical strength, temperature capability and chemical inertness although, most of the presently used systems show large hysteresis. More importantly, the resistance change with relative humidity is linear only in a limited range, curtailing their wider applications. This nonlinearity and the hysteresis also varies with the microstructure of the system, typical, e.g., being $SiO_2$—$ZnO$ and $MgO$—$Cr_2O_3$—$TiO_2$.

From a practical point of view, minimum hysteresis, large change in resistance with humidity, linearity over a wide humidity range, fast response (few seconds) and ability for easy rejuvenation can be considered as the diagnostic criteria to judge humidity sensors.

The objective of the present invention is to provide a durable humidity sensing element which has negligible hysteresis than the prior humidity sensing materials and a good response time, with easy processing procedures as described in the given examples.

The above objectives may be accomplished, according to the preferred form of invention by using a new ceramic material ($Li_2Sn_{1-x}M_xO_3$ when M is taken from Fe, Cr, Mn, Co, Ni, V, Pr and La) for humidity sensors based on the ternary oxide system $Li_2O$—$SnO_2$—$MnO_2$.

BRIEF DESCRIPTION OF THE DRAWINGS

The performance of this material when compared with the best humidity sensitive materials available found that the order of magnitude of resistance change with relative humidity showed the superiority of this material over the other conventional ceramic materials as can be seen from FIG. 1 of the drawing accompanying this specification.

When a ceramic material such as $Li_2SnO_3$ is mixed with a small concentration of La, Mn, Fe, Cr, Ni, Pr or V it shows unusually large resistance change with the change in relative humidity. This change in electrical resistivity arises due to the adsorption of water molecule on the surface of the oxide material by chemisorption or physisorption. This absorbed water molecule can be completely removed by heating the material to 350°–400° C. and the electrical resistance becomes the original value. Moreover, the slope of the curve relating log R with relative humidity is quite high compared to other ceramic oxides, thus increasing the accuracy (see FIG. 1 accompanying). Finally, the variation of electrical resistance is insensitive to the direction of increase or decrease of relative humidity, causing minimum hysteresis. More specifically, it is contemplated that the microstructure control by using Lithium carbonate as one of the raw materials provide suitable adsorption desorption characteristics along with concomitant capillary condensation.

According to the present invention, a ceramic material was synthesized by solid state reactions between Stannic oxide and Lithium carbonate at about 900° C. Transition metal ions present in trace amounts were found to be essential to cause the required change in electrical resistivity with change in water content of the atmosphere. The control of the porosity to get an average pre size of 15–20 A° with surface area of about 15 m$^2$/gm and desired microstructure to get particle size of about 1 micron were again crucial to get optimum performance even with the single-phase material. The formation of a $Li_2SnO_3$ phase with a monoclinic structure (a=5.22 A, b=9.1 A, c=9.94 A) was confirmed by X-ray diffraction.

Accordingly, the present invention provides a process for the preparation of Lithium stannate doped with transition metal ceramic material useful for humidity sensors which comprises mixing a salt of Lithium selected from $Li_2SO_4$, $Li_2CO_3$, LiOH with $SnO_2$ in dry condition, thereafter mixing in wet condition using an organic solvent like acetone, carbon tetrachloride, isopropanol or methanol, adding a transition metal compound to the resulting mixture, mixing the mixture thoroughly, drying and compacting the mixture under pressure in the range of 5000 to 8000 lbs., heating the pellet so formed at a temperature in the range of 600° to 800° C. for a period in the range of 6 to 12 hours followed by cooling at the rate of 2° C./min up to 200° C.

The ratio of the concentration of the salt of Lithium and that of $SnO_2$ is in the range of 0.4 to 0.7.

The salt of Lithium may be selected from $Li_2SO_4$, $Li_2CO_3$ and LiOH. The transition metal can be selected from $La_2O_3$, NiO and $MnCO_3$ like compounds. The transition metal can be selected from La, Mn, Fe and the like elements.

The concentration of the transition metal may range from 0.02 to 0.4.

The solvent used may be selected from acetone, carbon tetrachloride, isopropanol or methanol.

The present invention is described and illustrated by the following Examples which should not, however, be construed to limit the scope of the invention.

EXAMPLE I 1.8 gm of $Li_2CO_3$ is mixed with 2.5 gm of $SnO_2$ powder in an agate mortar in dry condition. After the initial mixing, acetone is used for wet grinding. At this stage, 0.23 gm of $MnCO_3$ is added as a dry powder. Then this thoroughly mixed powder is dried and compacted under a pressure of 5000 lbs to form pellets of thickness 2 mm. These were then heated at 600°–800° C. for 6–12 hrs followed by cooling at the slow-cooling rate of 2° C./min up to 200° C. The electrical resistance of this pellet was measured by using a two-probe technique at various humidity values. The latter was controlled by mixing dry and wet air in a flow set-up.

EXAMPLE II 1.9 gm of Lithium carbonate is mixed with 2.2 gm of Stannic oxide powder and 0.6 gm of polyvinyl alcohol. After wet grinding using acetone, 0.15 gm of Manganese carbonate is added as dry powder and the mixture is thoroughly ground for thirty minutes. Pellets of 2 mm thickness were compacted under 5000 lbs load and were heated to 820° C. for six hours followed by slow cooling. Conducting silver paint was applied on both sides and the variation of electrical resistance was measured at various humidity in a set-up described in Example I.

ADVANTAGES

The most successful porous ceramic humidity sensor based on $MgCr_2O_4$—$TiO_2$ needs processing at about 1370° C. Our material can be processed at about 800° C. and this amounts to a large saving in terms of energy and power consumption.

Moreover, our material changes its electrical resistance to a much larger degree compared to other best commercially available ceramic oxides. In addition, the extent of linearity varies over a larger humidity range amenable for a wider application. Finally, the variation is much more steep for our material, which indicates a possibility of measuring very small changes in relative humidity by following electrical resistance. This, along with negligible hysteresis, allows the sensitivity of humidity detection to be greatly enhanced in the normal humidity ranges of operation. The possibility of heat-cleaning to eliminate contaminants after use is also an important advantage.

We claim:

1. A process for the preparation of ceramic material Lithium stannate doped with a transition metal for a humidity sensor, comprising:

mixing a salt of Lithium with $SnO_2$ in dry condition;

thereafter mixing in wet conditions using an organic solvent;

adding a transition metal compound to the resulting mixture;

mixing the mixture thoroughly;

drying and compacting the mixture in the range of 5000 to 8000 lbs;

heating the pellets so formed at a temperature in the range of 600° to 800° C. for a period in the range of 6 to 12 hours followed by slow cooling to room temperature.

2. A process as claimed in claim 1, wherein the ratio of concentration of the salt of Lithium and that of $SnO_2$ is in the range of 0.4 to 0.7.

3. A process as claimed in claim 1, wherein the salt of Lithium is selected from $Li_2CO_3$, $Li_2SO_4$ or LiOH.

4. A process as claimed in claim 1, wherein the transition metal is selected from La, Mn, Fe, Cr, Ni Co, V or Pr.

5. A process as claimed in claim 1, wherein the concentration of the transition metal ranges from 0.02 to 0.4.

6. A process as claimed in claim 1, wheren the solvent is selected from acetone, isopropanol, methanol or carbon tetrachloride.

* * * * *